United States Patent [19]

Fortmann et al.

[11] Patent Number: 5,115,889

[45] Date of Patent: May 26, 1992

[54] SHAFT CLAMPING DEVICE

[75] Inventors: Norbert Fortmann, Hanover; Helmut Gottling, Isernhagen; Horst Janetzko, Celle; Ralf Kook, Hanover; Hans Kruppa, Barsinghausen; Gerhard Scharnowski, Gehrden, all of Fed. Rep. of Germany

[73] Assignee: Mannesmann Rexroth Pneumatik GmbH, Hanover, Fed. Rep. of Germany

[21] Appl. No.: 581,745

[22] Filed: Sep. 13, 1990

[30] Foreign Application Priority Data

Sep. 16, 1989 [DE] Fed. Rep. of Germany ....... 3931014

[51] Int. Cl.$^5$ .................. G05G 5/14; F15B 15/26; F16D 63/00
[52] U.S. Cl. .................................................... 188/67
[58] Field of Search ............... 188/67, 82.8, 82.84, 188/170, 166, 167, 168

[56] References Cited

U.S. PATENT DOCUMENTS

| 2,620,813 | 12/1952 | Bloomfield | 137/38 |
| 2,815,736 | 12/1957 | Wright | 121/40 |
| 3,019,502 | 2/1962 | Walker, Jr. | 188/67 |
| 3,762,512 | 10/1973 | McIntyre | 188/189 |
| 3,951,238 | 4/1976 | Dent et al. | 188/67 X |
| 4,030,579 | 6/1977 | Sell | 188/67 X |
| 4,577,732 | 3/1986 | Gottling | 188/67 |
| 4,957,313 | 9/1990 | MacIntyre et al. | 188/67 X |

FOREIGN PATENT DOCUMENTS

| 660546 | 5/1938 | Fed. Rep. of Germany. |
| 2030355 | 2/1971 | Fed. Rep. of Germany. |
| 2616973 | 10/1977 | Fed. Rep. of Germany. |
| 3307644 | 9/1984 | Fed. Rep. of Germany. |
| 3319042 | 11/1984 | Fed. Rep. of Germany. |
| 3615985 | 11/1987 | Fed. Rep. of Germany. |
| 3707469 | 9/1988 | Fed. Rep. of Germany. |
| 988810 | 5/1951 | France | 188/67 |
| 1540210 | 8/1968 | France | 188/67 |

Primary Examiner—Matthew C. Graham
Assistant Examiner—Peter M. Poon
Attorney, Agent, or Firm—Buchanan Ingersoll

[57] ABSTRACT

A device is disclosed for the selective clamping of an axially moveable or rotatable cylindrical shaft. The device disclosed may be either of a spring actuated-pressure release or a pressure actuated spring release embodiment. A clamping sleeve is located coaxially surrounding the cylindrical shaft to be immobilized. The clamping sleeve is separated into clamping elements at one end by longitudinal slots in the generally cylindrical sleeve. An actuating element is also arranged coaxially to the cylindrical body and the clamping sleeve and is mounted exterior to the clamping sleeve. The clamping elements are located radially inwardly from the actuating element and are separated therefrom by a series of bearings. The bearings engage the actuating element and the clamping elements through matched sets of inclined ramp elements. Each clamping element is provided with a set of bearings and ramp elements. The ramp elements are positioned such that their inclined faces are parallel to each other and each abutting the bearing. Longitudinal movement of the actuating element urges the inclined faces together, which are restrained by the bearings therebetween. The unyielding actuation element thus urges, through the bearings, the displaceable clamping elements against the surface of the cylindrical shaft.

17 Claims, 3 Drawing Sheets

SHAFT CLAMPING DEVICE

BACKGROUND OF THE INVENTION

1. Field of the Invention

The present invention relates to a clamping device for a cylindrical shaft. More specifically, the invention relates to a clamping or locking device for restraining axial or rotatable movement of a cylindrical shaft.

2. Description of the Prior Art

The prior art is characterized by U.S. Pat. No. 4,577,732 and corresponding West German Patent Application No. 33 19 042. These devices are generally utilized for restraining a shaft as it is displaced longitudinally or rotatably. The clamping device is utilized to prevent movement of the shaft relative to the clamping unit. The activation force for the braking pressure is provided by a fluid introduced into the braking device. This fluid may be either air or hydraulic fluid. The device is specifically intended to permit both locking and unlocking of the shaft with relation to the housing.

U.S. Pat. No. 4,577,732 discloses a shaft which may be rotated or moved longitudinally within a braking housing. A series of ramped clamping elements are mounted adjacent the freely rotatably and longitudinally displaceable shaft. A series of ball or roller bearings are positioned on the ramp surfaces of the clamping devices and are designed to roll along the ramp surface. The ball or roller bearings are also in contact with a surface which is parallel to the surface of the rotatable shaft. This second surface is formed from the inner wall of a hollow piston. The second surface, the bearing and the ramped surface are positioned such that the bearing is rotated relative to the two surfaces by a movement of either. In this way, a displacement of the piston rolls the bearing along its inner wall and simultaneously rolls the bearing along the ramp surface of the clamping device. As the piston is unyielding, the bearing is urged against the ramped surface with increasing force as the bearing is displaced further along the ramp surface.

The ramp surface is designed to be flexible at one end, allowing slight displacement of the clamping means from its resting position. The clamping means is spaced at rest from the rotatable or axially displaceable shaft and urged by the bearing in contact with said shaft. Thus, the shaft is restrained from movement relative to the clamping means. The piston is displaced by fluid pressure in an adjacent chamber. The device illustrated in U.S. Pat. No. 4,577,732 is intended to be locked by increasing pressure in the fluid chamber and released by decreasing the pressure in the same chamber. The piston is moved from a locking to an unlocking position by the action of a spring. A restraining ring and a second spring are utilized to keep the bearing in registration with the two locking surfaces.

There are several limitations associated with the prior art device. The first such limitation is that the device which utilizes a specific cast or molded ramp clamping element is designed to be specifically fluid pressure activated. A second limitation is that the ramped clamping elements are integral to the shaft locking unit and require considerable time and effort to replace if worn or damaged. Relatedly, the use of a single roller or ball bearing with a single ramp surface contributes to premature wear or damage of the bearing surfaces.

There remains, therefore, a need in the art for a braking device which may easily be converted from a pressure actuated to a pressure released mechanism. Additionally, a device which utilizes easily replaceable bearing surfaces would require a minimum of repair time for replacement of the bearing surfaces. Lastly, a device is needed which minimizes the amount of wear on the bearings and the bearing surfaces to reduce the need for such repairs over time.

SUMMARY OF THE INVENTION

A device is disclosed herein which provides replaceable and interchangeable bearing surfaces which are easily removed for replacement or transition from a pressure actuated to a pressure released embodiment. Additionally, a device is disclosed which preferably utilizes multiple roller bearings to minimize the degradation of the bearing surfaces. The preferred embodiment of the device provides detachable ramp components which are fastened to the clamping means. These ramp surfaces are preferably hardened for long wear under difficult operating conditions. The ramped removable portions may be installed in one of two opposite positions which allows for flexibility of the device in terms of air pressure actuation or release.

The removable ramp clamping surfaces are furthermore provided on both the clamping means and the actuation means associated with the actuation piston. The ramp surfaces are arranged with respect to each other so that inclined running surfaces are parallel to each other and diagonally mounted with respect to the surface of the shaft upon which the clamping device is mounted. Multiple bearings are preferably utilized and are mounted between the two parallel ramp surfaces. In this way, a high clamping force is achieved with a low corresponding force on the actuating element. It is the utilization of corresponding parallel contact surfaces of the ramp portions which provide the device with the capability for multiple bearings. It is further the use of multiple bearings which reduces the wear on the running surfaces and the bearings of the device and permits longer service time therefor.

The contact surface portions, which have running surfaces for the roller bearings may be designed, in one embodiment, so that both the contact surface portions of the clamping and actuating elements have a slope or gradient This is illustrated as the preferred embodiment It is also contemplated, however, that these elements may be designed so that only the contact surface portions provided on the clamping element or on the actuation element have the slope or gradient The opposing contact running surface might then be provided as a flat surface. In this embodiment, a gap would occur between any bearing and the flat surface during the unclamped mode of the device. Similarly, only a single bearing could be utilized in this embodiment for each clamping element.

An additional embodiment of the device utilizes a second pressure medium chamber rather than a spring as the resilient means utilized for restoring the actuating element from its first position to its second position.

A final alternative embodiment of the device may be utilized in the event that a central cylindrical shaft is not utilized and that the piston itself must be secured in a particular working position. In this embodiment, the longitudinal slots between clamping elements could be applied to the actuating element while the inner clamping sleeve is of rigid construction. Movement of the inner clamping sleeve would permit the sections of the outer sleeve to engage the inner walls of the cylinder by a similar method as described herein.

These and other advantages and features of the present invention will be more fully understood with reference to the preferred embodiments thereof and to the appended drawings.

DESCRIPTION OF THE PREFERRED EMBODIMENTS

Figure 1A:
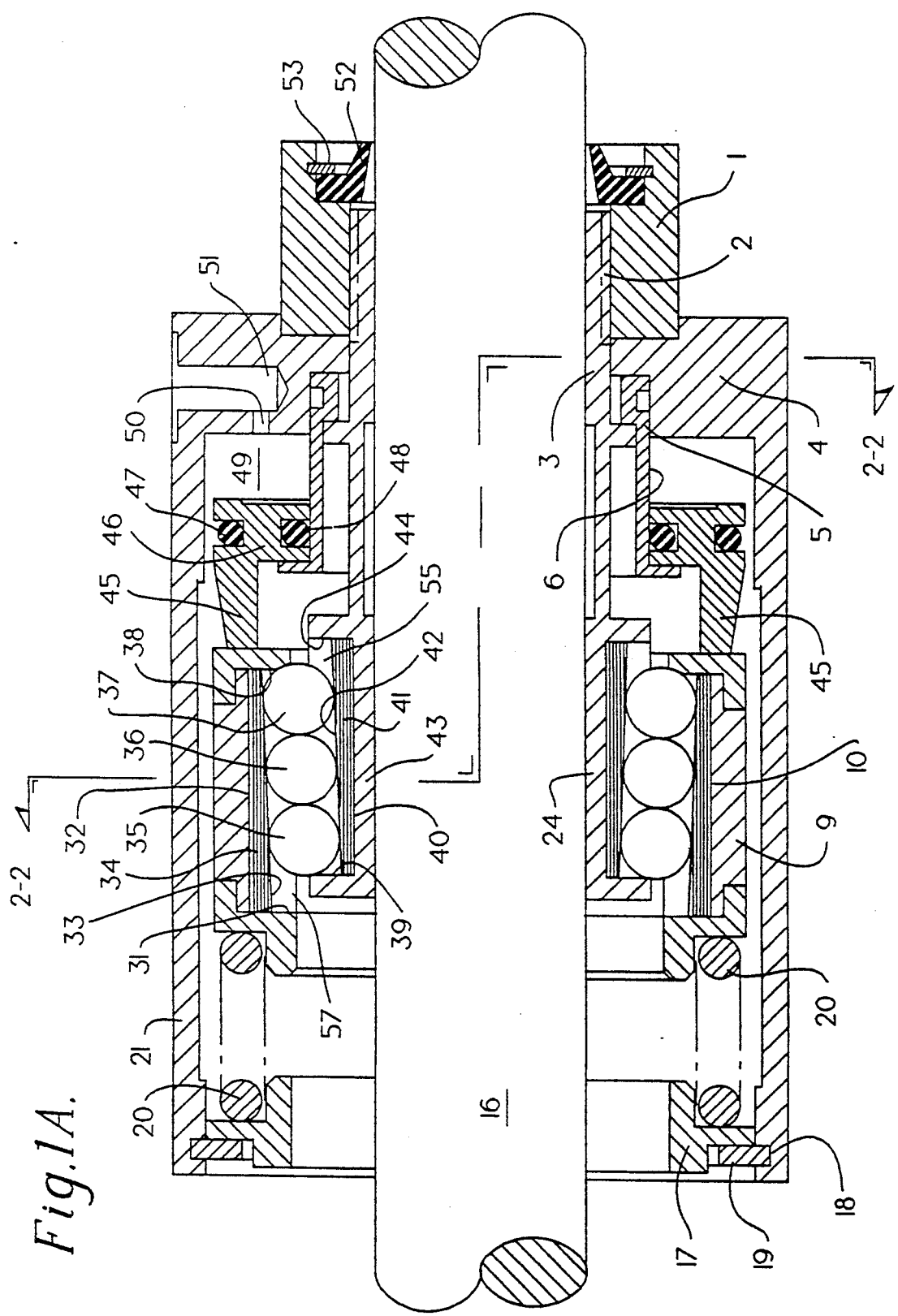
FIG. 1A is a sectional view of a spring-actuated pressure-release configuration of the clamping device of the invention.
Figure 1B:
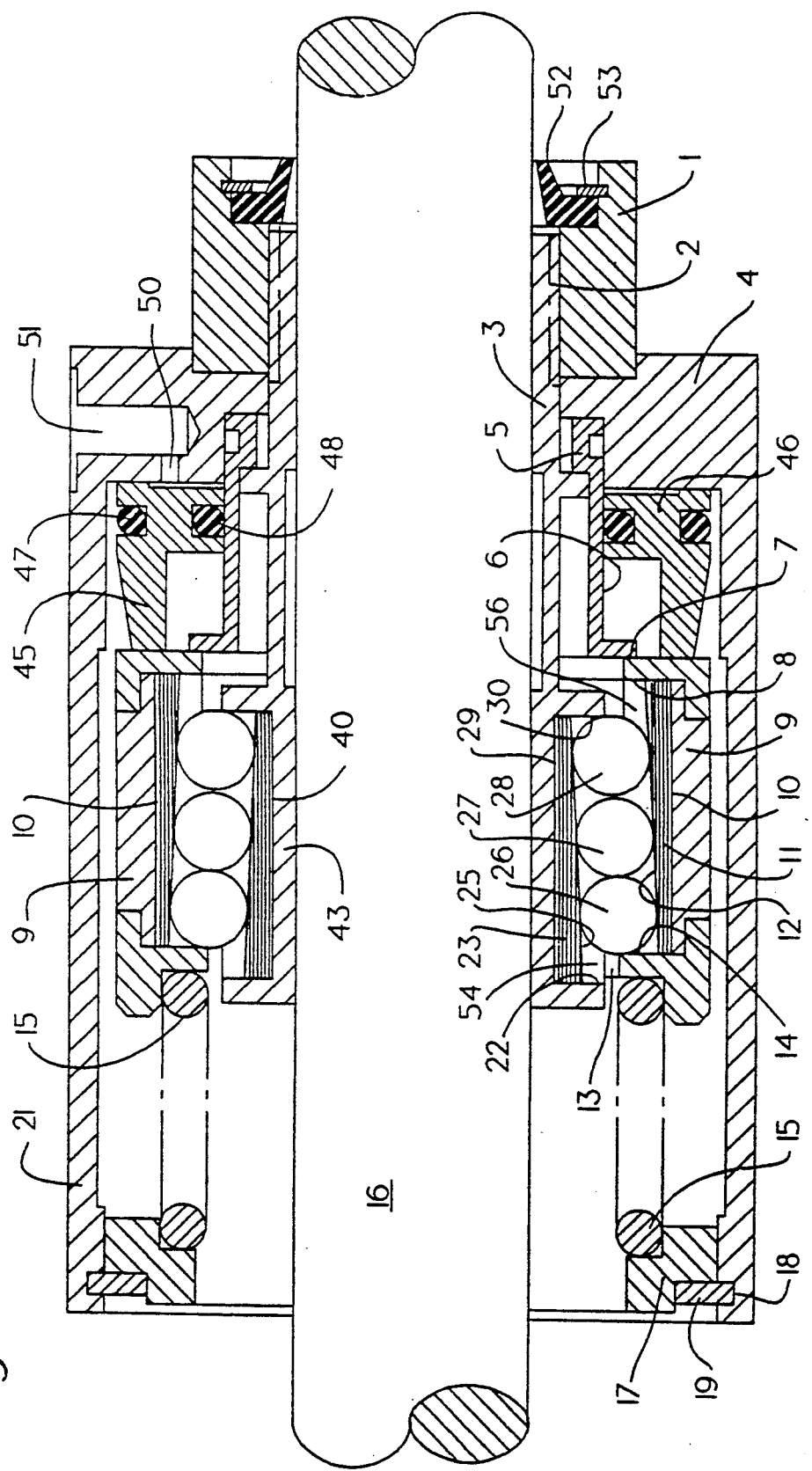
FIG. 1B is a sectional view of a pressure-actuated spring-release configuration of the clamping device of the invention.

Referring to FIGS. 1A and 1B, the clamping device is illustrated having a housing base 21 and a housing head 4. The housing base 21 and the housing head 4 are preferably integrally formed of a single unit. A cylindrical ring 1 is connected through threads 2 with clamping sleeve 3. The cylindrical shaft 16 is slidably mounted within clamping sleeve 3 and is both axially movable and rotatable within clamping sleeve 3. Cylindrical shaft 16 is sealed off from cylindrical ring 1 by means of sealing ring 52 which is retained in position by a retaining ring 53.

Figure 2:
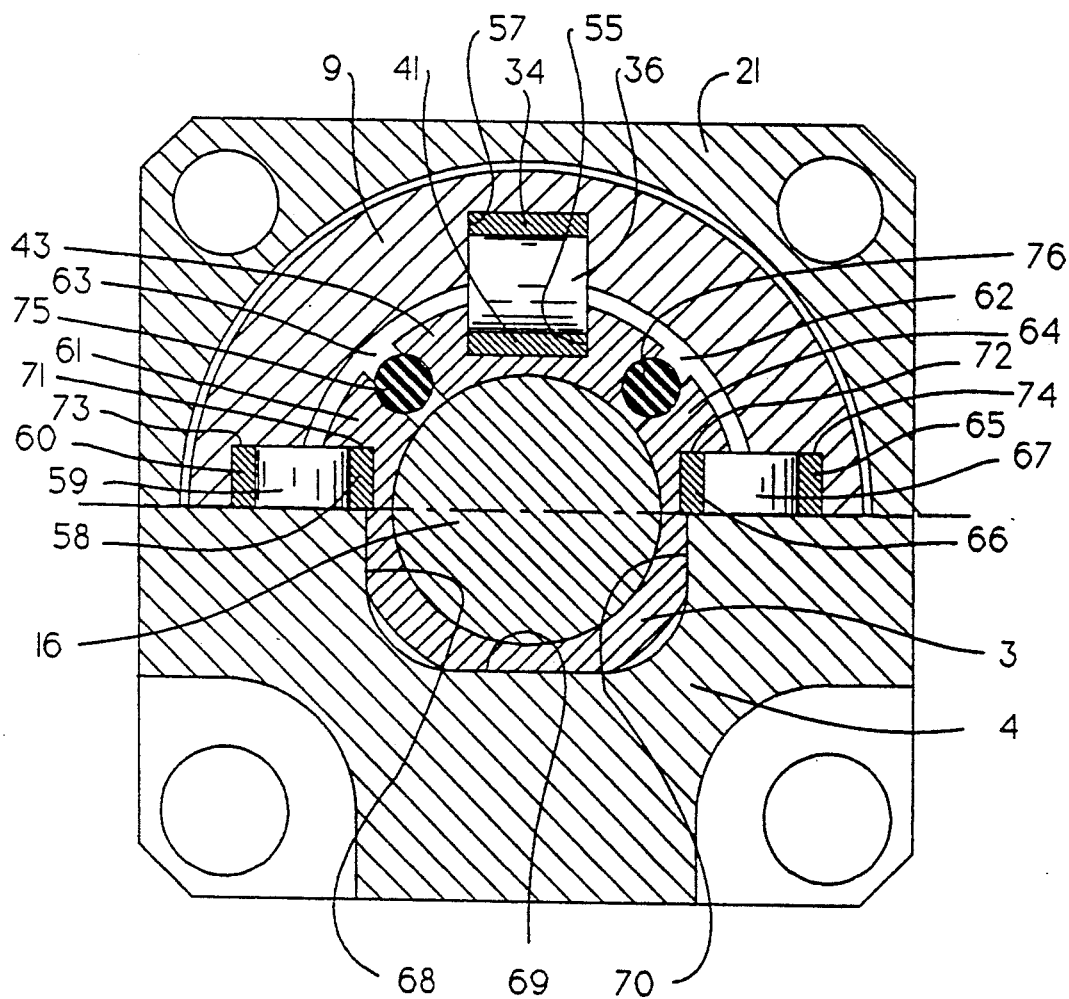
FIG. 2 is a sectional view of the device shown in FIG. 1A taken along line 2—2.

Cylindrical shaft 16 is also mounted coaxially within clamping sleeve 3. Referring to FIG. 2, it can be seen that clamping sleeve 3 is slotted longitudinally at the free, clamping end which is opposite that in contact with cylindrical ring 1. Referring to the top portion of FIG. 2, the slots 62 and 63 of clamping sleeve 3 allow for some independent movement of clamping elements 61, 43 and 64.

Referring again to FIGS. 1A and 1B, the clamping end of clamping sleeve 3 is further provided with recesses 54 and 55 which are provided in each of the clamping elements 61, 43 and 64. Referring again to FIG. 2, the recesses 71 and 72 are also provided in the two clamping elements 61 and 64 not shown in FIG. 1A or FIG. 1B. For the purposes of clarity, it is to be noted that all four of the clamping elements are identical in their construction. Further illustration of the device will refer only to FIGS. 1A and 1B and the two clamping elements illustrated therein.

Ramp elements 23 and 41 are mounted within the recesses 54 and 55, respectively. These ramp elements extend longitudinally parallel to the cylindrical shaft 16. Each ramp element 23 and 41 has a running surface 25 and 42, respectively, upon which the bearings will move.

The recesses 54 and 55 are provided such that each has a recess face at each end of the ramp element. Ramp element 23 is therefore associated with recess 54 having faces 22 and 30, while ramp element 41 is associated with recess 55 which contains faces 44 and 39. The faces are utilized to provide a retaining means for the ramp elements and further to provide a stop for the movement of the bearings as will be described later. Each face projects radially outwardly from the clamping sleeve 3 beyond the surface of its associated ramp element 41 or 23.

A second sleeve is mounted coaxially to clamping sleeve 3 and serves as the actuating element 9. Actuating element 9 surrounds clamping sleeve 3 on a portion of its axial extension. More specifically, it surrounds clamping sleeve 3 adjacent the clamping end of clamping sleeve 3. Actuating element 9 is displaceable relative to the cylindrical shaft 16 and clamping sleeve 3 in the direction of their longitudinal axes.

Actuating element 9 is provided, similar to clamping sleeve 3, with recesses extending perpendicularly to its circumference and longitudinally with respect to cylindrical shaft 16. Each of the recesses 56 and 57 is in radial registration with similar recesses 54 and 55 of clamping sleeve 3. This is illustrated more fully in FIG. 2.

Referring again to FIGS. 1A and 1B, each of recesses 56 and 57 serves to receive a ramp element 11 and 34, respectively. Ramp elements 34 and 11 are essentially similar to corresponding ramp elements 41 and 23 save that they are mounted 180°0 with respect thereto. This provides running surfaces 33 and 12 which are in a parallel orientation to corresponding running surfaces 42 and 25, respectively. Recess 56 is provided with faces 8 and 14 and recess 57 is provided with faces 31 and 38. These faces, like those associated with recesses 54 and 55, provide a restraining means for the ramp elements 34 and 23. Furthermore, they also provide a stop for the bearings as will be described later. These faces extend radially inwardly from actuating element 9 towards clamping sleeve 3 and cylindrical shaft 16, extending beyond the running surfaces 33 and 12 of ramp elements 34 and 11, respectively.

Recesses 54 and 55 in conjunction with recesses 56 and 57, respectively, form pockets between the clamping sleeve 3 and actuating element 9. Each pocket is adapted to contain three roller bearings. The pocket formed by recesses 55 and 57 contains roller bearings 35, 36 and 37 while the pocket formed by recesses 54 and 56 contains roller bearings 26, 27 and 28. The roller bearings are arranged one behind the other and move in the direction of the longitudinal axis of clamping sleeve 3 and cylindrical shaft 16. The roller bearings are mounted in contact with running surfaces 33, 42, 12 and 25. Roller bearings 35, 36, and 37 are associated with running surfaces 33 and 42 while roller bearings 26, 27 and 28 are associated with running surfaces 25 and 12. The roller bearings are designed so that their axes of rotation run perpendicularly to the longitudinal axes of clamping sleeve 3 and cylindrical shaft 16. It is to be specifically noted that spherical bearings may be provided as a substitute for roller bearings.

A pressure medium connection 51 is provided in housing head 4 for the introduction of fluid pressure from an exterior source into pressure medium chamber 49. A channel 50 serves to connect pressure medium connection 51 to pressure medium chamber 49. Pressure medium chamber 49 is formed by an inner wall of housing head 4 at one extreme and piston 46 at the other. Piston 46 is slidably mounted within pressure medium chamber 49, which generally forms a cylindrical hollow cavity within housing base 21. The piston is limited in its axial travel by projecting sleeve 5.

Projecting sleeve 5 is slidingly mounted with housing head 4. A seal may be provided to prevent the escape of fluid pressure from pressure medium chamber 49 around projecting sleeve 5, clamping sleeve 3 and cylindrical shaft 16. Projecting sleeve 5 is generally in the form of a cylinder having a tubular body 6 and stop 7 at one end adapted to engage the piston 46. Projecting sleeve 5 is mounted within housing head 4 at its end opposite said stop 7 and is restrained at that same end within housing head 4 by clamping sleeve 3 which is mounted coaxially within projecting sleeve 5. Projecting sleeve 5 is also mounted coaxially within piston 46, which is provided with an annular space in the center thereof. Piston 46 is displaceable along the tubular body 6 of projecting sleeve 5 and is limited in its travel by the stop 7 and the housing head 4 which forms the top of the cylinder of pressure medium chamber 49.

Sealing means 47 and 48, which are preferably in the form of O-rings, are provided in piston 46. Sealing means 47 is located within piston 46 such that it is in contact with the cylinder wall of pressure medium chamber 49. Sealing means 48 is also located within piston 46 but is in sealing contact with projecting sleeve 5. The sealing means are provided to prevent the escape of fluid pressure around piston 46 and into the remainder of the chamber within housing base 21. Pressure medium chamber 49 may be further defined by a stepped portion of the walls of housing base 21. This stepped portion causes the cylinder wall adjacent pressure medium chamber 49 to be slightly thicker than the remaining walls of housing base 21.

Piston 46 is provided with piston skirt 45 which extends perpendicularly from piston 46 toward actuating element 9. Piston skirt 45 is therefore coaxially mounted around clamping sleeve 3 and cylindrical shaft 16. The piston skirt 45 is adapted to abut actuating element 9 and displace it longitudinally with respect to clamping sleeve 3 and cylindrical shaft 16. A resilient means, preferably in the form of a spring, is provided at the opposite end of actuating element 9 and is intended to resiliently bias actuating element 9 into a position abutting piston skirt 45.

A resilient means, which is preferably in the form of a spring, is mounted engaging actuating element 9 and spring retaining ring 17. Spring retaining ring 17 restrains the resilient means and is held in place by retainer 19, mounted in slot 18 of housing body 21. The spring is of generally cylindrical form and is mounted coaxially exterior to cylindrical shaft 16 and is generally of the same diameter as actuating element 9. Spring retaining ring 17 provides a base against which actuating element 9 is resiliently biased. Two springs are illustrated in FIGS. 1A and 1B. Heavier spring 20 is shown in the upper portion of FIG. 1A while lighter spring 15 is illustrated in the lower portion of FIG. 1B. The heavier spring 20 is preferably utilized if the clamping force is to be induced by a spring and released through the use of fluid pressure. This spring actuated-air release embodiment is illustrated in FIG. 1A. FIG. 1B illustrates a fluid actuated-spring release embodiment which preferably utilizes lighter spring 15 as the restoring force to bias the actuating element 9 rightwardly, as shown in FIG. 1B, into the release position.

Referring now to FIG. 2, three of the four clamping elements are illustrated, being clamping elements 61, 43 and 64. Slots 62 and 63 are shown between the individual clamping elements. Recesses 55, 71 and 72 are illustrated within clamping elements 61, 43 and 64 and contain ramp elements 58, 41 and 66, respectively. Recesses 73, 57 and 74 are provided within actuating element 9 and also contain ramp elements 60, 34 and 65, respectively. Roller bearings 59, 36 and 67 are illustrated as mounted within the combined recesses, as shown in a clockwise fashion in FIG. 2. It should be specifically noted that clamping elements 61 and 64 are preferably associated with three roller bearings in a similar fashion to clamping element 43 as shown in FIG. 1A.

Clamping elements 61, 43 and 64 are separated by resilient elements 75 and 76 as shown in FIG. 2. Resilient elements 75 and 76 preferably consist of an elastic material provided within slots 63 and 62. These elements press the clamping elements away from each other, by which a slight release of the clamping is effected. This provides a small space between the clamping elements and cylindrical shaft 16 such that cylindrical shaft 16 may be displaced relative to the clamping elements when the locking device is not engaged.

It is apparent from FIG. 2 that clamping sleeve 3 is secured from rotation within housing head 4 by its squared off perimeter. Flat faces 68, 69 and 70 are provided at the end of clamping sleeve 3 adjacent housing head 4. Housing head 4 is similarly flattened to secure clamping sleeve 3 from such rotation.

In operation, both the spring actuated-pressure release and the pressure actuated spring release embodiments may be utilized to secure the rotation or longitudinal movement of cylindrical shaft 16. In the pressure actuated spring released embodiment, as shown in the lower portion of FIG. 1B, fluid pressure is introduced through pressure medium connection 51 through channel 50 and into pressure medium chamber 49. This displaces piston 46 leftwardly, a shown in FIG. 1B, along tubular body 6 of projecting sleeve 5 and along the interior wall of housing body 21.

Piston skirt 45, which abuts actuating element 9, displaces actuating element 9 leftwardly, as shown in FIG. 1B, against the resilient force of lighter spring 15. Roller bearings 26, 27 and 28 are also shifted in the same direction by the movement of actuating element 9. During this process, the inclined running surfaces 12 and 25 are compelled to approach each other because of the movement of actuating element 9 and ramp element 11 against the stationary positioning of clamping sleeve 3 and ramp element 23. It should be specifically noted that although the action of one clamping element is described, this process occurs simultaneously in all clamping elements of the device.

Roller bearings 26, 27 and 28 are located between ramp elements 11 and 23 and maintain an equal distance between running surfaces 12 and 25. Actuating element 9 is rigidly constructed and does not permit displacement of ramp element 11 radially outwardly. Thus, the only flexible portion of the device, being clamping element 24, is displaced radially inwardly by the force of actuating element 9, ramp element 11 and roller bearings 26, 27 and 28 on ramp element 23. Clamping element 24 is thus urged radially inwardly against the surface of cylindrical shaft 16. As all of the clamping elements engage the cylindrical shaft 16 in a similar fashion, cylindrical shaft 16 is therefore secured from movement in either a rotational or axial direction.

In this embodiment, cylindrical shaft 16 may be released after such a locking operation by the release of the fluid pressure in pressure medium chamber 49 through channel 50 and pressure medium connection 51. As the pressure from pressure medium chamber 49 is released, the resilient force of lighter spring 15 acting upon actuating element 9 becomes greater than the counterforce of the fluid pressure on piston 46. Lighter spring 15 thus displaces actuating element 9 rightwardly, as shown in the lower half of FIG. 1B, urging piston 46 by means of piston skirt 45 further into pressure medium chamber 49. The displacement of actuating element 9 in this fashion further displaces ramp element 11. The movement of ramp element 11, coupled with the fixed positioning of ramp element 23 in clamping sleeve 3 causes roller bearings 26, 27 and 28 be displaced in the same manner. The roller bearings roll rightwardly, as shown in FIG. 1B, because of the movement of face 14. As the running surfaces 12 and 25 are longitudinally displaced, the distance between them increases. Clamping element 24 is thus free to resume its rest position, spaced apart from the surface of cylindrical shaft 16. Cylindrical shaft 16 is therefore free to rotate or be longitudinally displaced within clamping sleeve 3.

In the spring actuated-pressure release embodiment illustrated in the upper portion of FIG. 1A, the locking action is provided by heavier spring 20 and held off by the pressurization of pressure medium chamber 49. Cylindrical shaft 16 is secured from movement within clamping sleeve 3 because pressure medium chamber 49 has been evacuated of fluid pressure and heavier spring 20 has displaced actuating element 9 to its maximum extension. In this embodiment, to release the locking action of the device, fluid pressure is introduced into pressure medium chamber 49 as previously described. The leftward movement of piston 46, which is shown in the upper portion of FIG. 1A, again displaces actuating element 9 leftwardly against the resilient force of heavier spring 20. As actuating element 9 is displaced, ramp elements 34 and 41 are similarly displaced with respect to each other. Ramp element 41 is held stationary within clamping sleeve 3 while ramp element 34 is displaced longitudinally by the movement of actuating element 9. Clamping element 43, which has heretofore been urged into contact with the surface of cylindrical shaft 16 by the force of actuating element 9, is released. This occurs as running surfaces 33 and 42 are displaced away from each other. The action of roller bearings 35, 36 and 37 is similar to the action of roller bearings 26, 27 and 28 described previously. Cylindrical shaft 16 is now free to rotate within clamping sleeve 3.

In order to engage the locking device in the spring actuated pressure release embodiment, fluid pressure is evacuated from pressure medium chamber 49 through pressure medium connection 51. The resilient force of heavier spring 20 is thus greater than the restraining force provided by fluid pressure within pressure medium chamber 49. The resilient force of heavier spring 20 displaces actuating element 9 rightwardly, as shown in the top portion of FIG. 1A. The movement of actuating element 9 in this direction causes ramp element 34 to be similarly displaced. With the movement of ramp element 34, running surfaces 33 and 42 are displaced closer to each other. As the distance between these two surfaces must remain the same because of the presence of the roller bearings 35, 36 and 37, clamping element 43 is therefore displaced radially inwardly by the pressure on running surface 42. Clamping element 43 is thus brought in contact with the outer surface of cylindrical shaft 16 and secures cylindrical shaft 16 from movement.

Referring to FIG. 2, during the clamping and releasing operation of the device in either the spring actuated-pressure release or pressure actuated spring release embodiments, the clamping and unclamping action of clamping elements 61, 43 and 64 are very similar. In either embodiment, when the clamping elements are induced into engagement with the surface of cylindrical shaft 16, resilient elements 75 and 76 are compressed to permit a reduction of the diameter of clamping sleeve 3 formed by clamping elements 61, 43 and 64. This brings clamping sleeve 3 into contact with the surface of cylindrical shaft 16 through the clamping elements 61, 43 and 64.

The ramp elements on both the actuating element 9 and clamping sleeve 3 may be affixed by any known means to their respective recesses. It is specifically noted that the clamp elements may be removably mounted such that mere removal and replacement of each ramp element 180 from its prior position will enable the device to be switched from the pressure actuated spring released embodiment to the spring actuated pressure released embodiment.

While we have described a present preferred embodiment of the invention, it is to be distinctly understood that the invention is not limited thereto but may be otherwise embodied and practiced within the scope of the following claims.

We claim:

1. A clamping device for an axially and rotatably movable cylindrical body of the type comprising:
   a) a carrier arranged coaxially to the cylindrical body and spaced therefrom;
   b) clamping means located on said carrier essentially radially outwardly from a cylindrical body associated therewith for forceably engaging said cylindrical body;
   c) at least one clamping ramp detachably mounted on said clamping means, said clamping ramp having a running surface thereon inclined to the longitudinal axis of said cylindrical body;
   d) actuating means for actuating said clamping means, said actuating means having an actuating element mounted coaxially to the cylindrical body radially outwardly of said clamping means and longitudinally movable relative thereto, said actuating element having an inner portion defining an actuating surface, said actuating surface opposed and parallel to said running surface and defining a cavity therebetween;
   e) bearing means for urging said clamping means onto said cylindrical body when said actuating element is longitudinally moved, said bearing means having a bearing set of at least two bearings of generally equivalent diameter within said cavity engaging said running surface and said opposing actuating surface; and
   f) means for displacing the actuating means in the longitudinal direction of the cylindrical body.

2. A clamping device as described in claim 1, wherein said clamping ramp consists of a hardened material.

3. A clamping device as described in claim 1, wherein said bearing set comprises three roller bearings arranged in the direction of the longitudinal axis of said clamping means and said actuating element.

4. A clamping device as described in claim 3, wherein said roller bearings are arranged in the peripheral direction of said clamping means and said actuating element.

5. A clamping device as described in claim 1, wherein said carrier further comprises a cylindrical element having at least one longitudinal slot provided therein to form clamping elements, the clamping means formed therefrom.

6. A clamping device as described in claim 5, further comprising resilient elastic material located within said slots.

7. A clamping device as described in claim 1, wherein the actuating means further comprises a sleeve.

8. A clamping device as described in claim 1, wherein said carrier further comprises a sleeve.

9. A clamping device as described in claim 1, wherein said actuating means further comprises a piston surrounding at least a portion of said carrier and axially displaceable relative thereto, said piston engaging said actuating element.

10. A clamping device as described in claim 9, wherein said means for displacing said actuating means is a pressure medium chamber adjacent said piston which causes displacement of said piston when a pressure medium is introduced therein.

11. A clamping device as described in claim 10, further comprising resilient means providing a restoring force when the pressure medium is released from said pressure medium chamber to restrain the cylindrical body with relation to said clamping means.

12. A clamping device as described in claim 10, further comprising resilient means providing a restoring force when the pressure medium is released from said pressure medium chamber to release the cylindrical body from contact with said clamping means.

13. A clamping device as described in claim 12, wherein said resilient means is a spring.

14. A clamping device as described in claim 1, wherein said means for displacing said actuating means is a spring.

15. A clamping device as described in claim 1 further comprising an actuating ramp detachably mounted on said actuating element, said actuating ramp defining said actuating surface.

16. A clamping device as described in claim 15 wherein said clamping ramp and said actuating ramp are mounted within respective recesses in said clamping means and said actuating element, each of said recesses having a depth greater than the height of the corresponding ramp, thus providing stops delimiting the movement of said bearings in the direction of the longitudinal axis of said cylindrical body.

17. A clamping device as described in claim 15 wherein said clamping means and said actuating element are configured to receive said clamping ramp and said actuating ramp respectively, in a first longitudinal orientation and a second longitudinal orientation, said second longitudinal orientation being a 180R rotation from said first longitudinal orientation.

* * * * *